US010928506B1

United States Patent
Woodring et al.

(10) Patent No.: US 10,928,506 B1
(45) Date of Patent: Feb. 23, 2021

(54) PREVENTING COMMERCIAL AIRCRAFT FROM BECOMING INVISIBLE TO AIR TRAFFIC CONTROL

(71) Applicant: Squawk On, LLC, Silver Spring, MD (US)

(72) Inventors: Cooper C Woodring, Wakefield, RI (US); Bret Joseph Petersen, Carthage, MO (US)

(73) Assignee: Squawk On, LLC, Silver Spring, MD (US)

( * ) Notice: Subject to any disclaimer, the term of this patent is extended or adjusted under 35 U.S.C. 154(b) by 0 days.

(21) Appl. No.: 17/007,228

(22) Filed: Aug. 31, 2020

(51) Int. Cl.
*G01S 13/76* (2006.01)
*G01S 13/91* (2006.01)
*G01S 13/87* (2006.01)

(52) U.S. Cl.
CPC ............ *G01S 13/767* (2013.01); *G01S 13/87* (2013.01); *G01S 13/91* (2013.01)

(58) Field of Classification Search
CPC ........ G01S 13/767; G01S 13/87; G01S 13/91; G01S 13/913; G01S 13/933; G01S 2013/916; G08G 5/00; G08G 5/0017; G08G 5/0021; G08G 5/0095; G08G 5/02; G08G 5/025; G08G 5/04; G08G 5/045; G08G 5/06; G08G 5/065
See application file for complete search history.

(56) References Cited

U.S. PATENT DOCUMENTS

| 4,128,835 | A | * | 12/1978 | Russell | G01S 13/79 342/46 |
| 5,159,344 | A | * | 10/1992 | Robinson | B60R 25/102 340/426.16 |
| 5,629,692 | A | * | 5/1997 | Stayton | G08G 5/0008 340/961 |
| 6,681,158 | B2 | * | 1/2004 | Griffith | B64D 45/0015 701/3 |
| 6,825,795 | B1 | * | 11/2004 | Segredo | B64D 45/0015 342/51 |
| 2010/0114491 | A1 | * | 5/2010 | Maily | G01S 19/15 701/301 |
| 2010/0171647 | A1 | * | 7/2010 | Naravanamurthy | G01S 13/767 342/37 |
| 2010/0328139 | A1 | * | 12/2010 | Iwasaki | G01S 13/785 342/47 |
| 2011/0102236 | A1 | * | 5/2011 | Wajer | G01S 13/78 342/45 |
| 2013/0141268 | A1 | * | 6/2013 | Getson | G08G 5/0078 342/30 |

(Continued)

*Primary Examiner* — Peter M Bythrow
(74) *Attorney, Agent, or Firm* — NovoTechIP International PLLC

(57) ABSTRACT

A system and method for controlling multiple transponders in an aircraft to prevent the aircraft from becoming invisible to air traffic control. If a first transponder is turned off when the aircraft is airborne, a second transponder will automatically switch on. In some implementations, if the second transponder is turned off, a third transponder will automatically switch on. In one implementation, the third transponder cannot be turned off while the touchdown-relay confirms the aircraft is in the air. When the aircraft has landed, whichever one of the three transponders is on may be turned off. In some implementations the multiple transponders are arranged in a circular daisy chain.

19 Claims, 12 Drawing Sheets

(56) References Cited

U.S. PATENT DOCUMENTS

| | | | | |
|---|---|---|---|---|
| 2014/0303813 A1* | 10/2014 | Ihns | .................. | H04L 7/0083 |
| | | | | 701/3 |
| 2016/0155336 A1* | 6/2016 | Getson | ................ | G01S 13/933 |
| | | | | 340/981 |
| 2017/0106997 A1* | 4/2017 | Bekanich | ........... | H04B 7/18506 |
| 2018/0299530 A1* | 10/2018 | Polynin | ................. | G01S 19/17 |
| 2019/0162841 A1* | 5/2019 | Peckham | ............... | G01S 1/685 |

* cited by examiner

PREVENTING COMMERCIAL AIRCRAFT FROM BECOMING INVISIBLE TO AIR TRAFFIC CONTROL

BACKGROUND

Several years ago, airborne Malaysia Airlines Flight 370 suddenly became invisible to ground based air traffic control and became lost, resulting in 239 deaths. The aircraft has never been found. While most air safety experts are focused on locating the wreckage, this disclosure seeks to prevent it from ever happening again.

All commercial aircraft are required to have a flight-transponder. A transponder is a combination of a transmitter and a responder. Someone in the secured flight deck of a commercial aircraft turns the transponder on when the aircraft is on the ground and is preparing for takeoff, usually during the verbal review of the checklist. The transponder informs "air traffic control" (ATC) on the ground of the aircraft's specific identification, such as MH370 in the case of Malaysia Airlines Flight 370, plus the aircraft's location, speed, direction and altitude so that air traffic control on the ground can maintain separation between the many aircraft in their "flight information region" (FIR).

Some commercial aircraft have two flight-transponders, allowing anyone in the flight deck to turn off the first transponder in the extremely rare case that it overheats (fire being probably the single greatest threat to an airborne commercial airliner) or if the first transponder transmits dangerously incorrect information, which can be worse than no information. If the first transponder is turned off, the second transponder may be turned on to keep the aircraft in communication with air traffic control; however the second transponder does not automatically switch on and the second transponder may also be turned off.

Air traffic control frequently requests the transponder(s) be turned off when the aircraft has landed, so air traffic control can concentrate on the many aircraft in the air, not on the many aircraft already on the ground that they can normally see from the airport's tower.

Less than one hour after takeoff from Kuala Lumpur International Airport on Mar. 8, 2014, at 12:41 in the morning, air safety experts and investigators believe that a nefarious person in the secured flight deck of Malaysia Airlines Flight 370 turned off the flight-transponder to make the aircraft invisible to ground based air traffic control. That led to the $350 million Boeing 777-200 "extended range" (ER) aircraft and its 227 passengers and crew of 12 to become lost for the past several years, and very possibly forever. The Boeing 777 series aircraft is one of the safest aircraft ever produced, with over 1,000 now in service.

Three of the four 9/11 commercial aircraft also had their transponders turned off by the hijackers. After the 9/11 attacks, there was a call for automated transponders; that is, transponders that could not be turned off, but aviation experts and pilots preferred "flexible control" in the rare case of a transponder malfunction.

It has not been conclusively proven that the disappearance of MH370 was pilot suicide, but a majority of air safety experts believe it was. Following is a list of suspected pilot suicides, totaling 2,895 deaths.

1976, Russia—A pilot stole an Antonov 2 biplane and flew it into a block of flats in Novosibirsk where his divorced wife lived. 2 deaths.

1979, Columbia—A recently fired mechanic stole a military HS-748 transport plane, taking off and crashing into a residential area of Bogota. 4 deaths.

1994, Russia—An air force engineer stole an Antonov 26 transport plane from the Kubinka base, near Moscow. The pilot circled the town of Kubinka until the plane ran out of fuel and crashed. 1 death.

1994, Morocco—A Royal Air Maroc ATR-42 crashed in the Atlas Mountains shortly after takeoff. It was suggested that the captain had disconnected the autopilot and directed the plane at the ground, however the Moroccan Pilot's Union challenged this conclusion. 44 deaths.

1979, Indonesia—A Silk Air Boeing 737 crashed en route to Singapore. It was suggested the captain may have committed suicide by switching off both flight transponders and intentionally put the plane into a dive. 104 deaths.

1999, Botswana—A captain stated over the radio that he was going to crash an ATR-42 plane. It hit two other parked aircraft at Gaborone Airport. 1 death.

1999, USA—An Egypt Air Boeing 767 entered a rapid descent half an hour after takeoff from JFK Airport, moments after the captain had left the flight deck. It was suspected the relief first officer had deliberately caused the accident, but the evidence was inconclusive. 217 deaths.

2013, Namibia—A LAM Mozambique Airlines Embraer ERJ-190 entered a rapid decent en route from Mozambique to Angola. Preliminary results indicate the accident was intentional. 33 deaths.

2015, France—Co-pilot of a Germanwings Airbus A320, Andreas Lubitz, deliberately crashed the plane in the French Alps en route to Dusseldorf after locking the pilot out of the flight deck. 150 deaths.

2014, Malaysia—While not yet conclusively pilot suicide, the flight-transponder of the Boeing 777 was turned off causing the aircraft to become invisible to air traffic control. The aircraft has not been found. 239 deaths.

SUMMARY

The present disclosure provides a safe, reliable and cost effective method and apparatus for commercial aircraft to have one of three-transponders, or one of two-transponders, always turned on when the aircraft is airborne, yet able to have whichever transponder was on, turned off when the aircraft is on the ground. This is accomplished by electrically connecting all three transponders of a three-transponder system, or both of the transponders of a two-transponder system, to the E/E (electrical and equipment) bay's touch-down-relay which in turn is electrically connected to the landing gear's squat-switch so the now smart-transponders can recognize whether the aircraft is airborne or has landed and is on the ground. One flight-transponder always being on prevents the aircraft from becoming invisible to air traffic control and becoming lost, as happened with MH370. A transponder for Boeing's 777 costs around $20,000, an amount proportionately insignificant compared to the $350,000,000 cost of the aircraft and the lives that might be saved.

BRIEF DESCRIPTION OF THE DRAWINGS

FIG. 2 shows the transponder turned on.

FIG. 5 shows the first transponder turned on.

FIG. 6 is a representation of the present disclosure's same three-transponder system shown in FIG. 5 showing the first transponder turned off and the second transponder automatically switched on.

FIG. 7 is a representation of the present disclosure's same three-transponder system shown in FIGS. 5 and 6 showing the first transponder turned off, the second transponder turned off and the third transponder automatically switched on.

FIG. 11 shows the first transponder turned on.

FIG. 10 is a representation of the present disclosure's same two-transponder system shown in FIG. 9 but showing the first transponder turned off and the second transponder automatically switched on.

FIG. 11 illustrates a diagram of a circuit for controlling transponders to prevent aircraft from becoming invisible to air traffic control.

FIG. 12 shows the first transponder being turned off.

FIG. 13 is a representation of the same three-transponder system shown in FIG. 12 showing the first transponder turned off, the second transponder being turned off causing the third transponder to automatically switch on.

FIG. 14 is a representation of the same three-transponder system shown in FIGS. 12 and 13 showing the first transponder turned off, the second transponder turned off and the third transponder being turned off causing the first transponder to automatically switch on.

Figure 1:
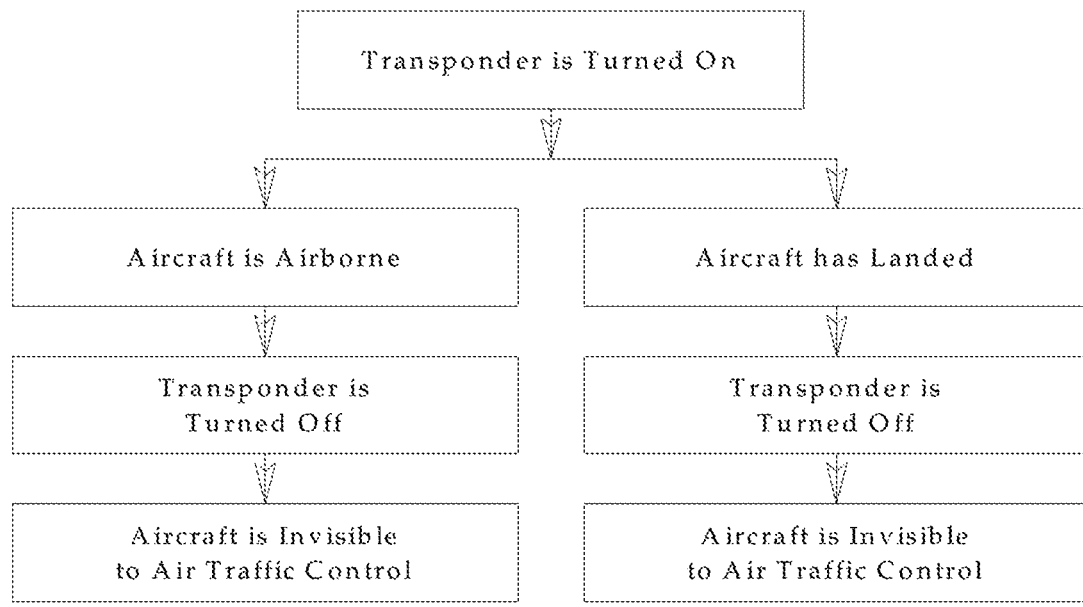
FIG. 1 is a flowchart diagraming the sequence of a prior art one-transponder system, whether the aircraft is airborne or has landed.

These drawings contain representations only of the inputting controls necessary to explain the present disclosure and are not limited to only the controls shown in the drawings. The transponders shown may have additional controls, such as standby and identify settings.

The transponders shown in the drawings show push buttons and rotary controls however other known types of controls may be used such as slide and toggle switches.

The transponders shown in the drawings each have an on-indicator light. If the on-indicator light in the drawing is darkened that indicates that the transponder is turned on, and if the on-indicator light is not darkened that indicates that the transponder is turned off.

DETAILED DESCRIPTION

A flight-transponder is a required electronic communications devise in the secured cockpit or flight deck of a commercial aircraft that receives interrogation (questioning or interviewing) from a ground located, "secondary surveillance radar" (SSR) on a frequency of 1030 MHz. Secondary surveillance radar is referred to as "secondary" to distinguish it from "primary" radar, sometimes called "skin paint" that works by passively reflecting high-powered microwave pulses off the skin of the aircraft and detecting the reflected echo. Primary radar determines range and bearing of the aircraft, but cannot determine altitude, except at very close range. Secondary surveillance radar uses an active beacon to transmit an interrogation from the secondary surveillance radar on the ground to the airborne aircraft. After receiving an interrogation, the aircraft's transponder transmits an immediate response to ground control in the form of a four-digit coded signal assigned by the air traffic controller on a frequency of 1090 MHz, called a "squawk-code".

Squawk-codes are four-digit numbers from zero to seven that a pilot inputs into the flight-transponder. The transponder must be turned on for a pilot to enter the four-digit code that enables the identified aircraft to communicate with air traffic control. This assures that a commercial aircraft cannot receive permission to takeoff from ground control if the transponder is turned off. The lowest possible squawk is 0000 and the highest is 7777. When changing squawk-codes while transitioning between different air traffic controllers' flight information regions care must be taken not to inadvertently squawk one of several emergency squawk-codes, such as squawk 7500 indicating a hijacking or squawk 7700 indicating an emergency. Newer, mode Select, or mode S, transponders have "automatic collision avoidance" (ACA) capability as well. All commercial aircraft are required to have their transponder or transponders certification-checked every two years. Many airlines exceed that requirement and have the transponders certification-checked every year.

There are several ways a squawk code can be assigned to a particular aircraft. A squawk code can be assigned to an aircraft when the pilot enters the aircraft's flight plan into an air traffic control computer at the airport of original departure. The squawk code is computer selected from a block of available codes in that "flight information region" (FIR). An airborne pilot may be requested to squawk a given code by air traffic control via the radio using a phrase such as "Malaysia 3-7-0 squawk 3-0-6-3". The digits are stated individually, never as squawk "three thousand sixty three". The pilot then enters the four-digit 3-0-6-3 code into the transponder and the blip, called a "data tag" on the air traffic control's radar screen, will be labeled with the aircraft's identification as "MH370".

There are many manufacturers of flight-transponders such as the Boeing 777 Series certified ACS's NXT 800, Becker, Rockwell, and Garmin. There are also many different features available on various transponders such as touchscreens, automatic collision avoidance (ACA) systems, weather maps and information, and flight-time-since-takeoff displays. The present disclosure is applicable to a wide variety of transponder manufacturers and features.

Just as all commercial aircraft have a required flight-transponder, all commercial aircraft also have a required "weight-on-wheels" (WOW) device, commonly referred to as a squat-switch. A squat-switch is an electrical device, typically a load cell or a displacement or proximity sensor, usually located on the aircraft's main landing gear's shock absorber strut that detects when the aircraft is on the ground because in the case of a Boeing 777 the 600,000-pound aircraft has loaded or compressed the landing gear. The squat-switch prevents anyone in the flight deck from inadvertently raising the landing gear while the squat-switch senses that the aircraft is still on the ground. Once the aircraft is in the air and the squat-switch detects that the landing gear is extended or unloaded, then and only then, can the pilot retract or stow the landing gear. When the aircraft is airborne, the squat-switch detects the landing gear is uncompressed whether the landing gear is extended or stowed. A pilot cannot fool the squat-switch into believing the aircraft is on the ground by lowering or extending the landing gear while the aircraft is still in the air.

The squat-switch is external to the aircraft's fuselage, at least when the landing gear is lowered or extended, and is therefore subject to high winds and severe temperature and weather conditions. The sometimes external squat-switch is therefore electrically connected to the touchdown-relay which is located in the aircraft's "electrical and equipment bay" (E/E bay) which is within the aircraft's pressurized fuselage and is therefore temperature and weather protected. The touchdown-relay is not a football term. It is a term applied to an electronic relay that confirms whether the aircraft is airborne or has "touched down" or landed. The aircraft's flight-transponders have now become "smart-transponders" as they can distinguish between the aircraft being airborne or landed.

The present disclosure electrically connects each transponder's on/off controls to the aircraft's squat-switch via the aircraft's touchdown-relay so when the aircraft is on the ground, the transponder may be turned off at the request of an air traffic controller. Occasionally air traffic control will request the pilot leave the transponder on after landing under unusual circumstances, such as during a heavy snow fall or dense fog at a very large airport when the aircraft may not be visible from the tower and the aircraft's location needs to be tracked. When the aircraft is in the air and the landing gear is extended, uncompressed or retracted, the squat-switch prevents anyone in the flight deck from being able to turn off the third transponder of a three-transponder system, or the second transponder of a two-transponder system, to prevent the commercial aircraft from becoming invisible to ground based air traffic control and thus lost, whether purposely or inadvertently.

The Federal Aviation Administration (FAA), and the aircraft industry in general, are extremely reluctant to mandate regulations that take control away from the aircraft's captain. This understandable reluctance is based on a "pilot without control" is no longer the "captain of the ship". As previously stated, some commercial aircraft have two independent transponders that provide a second or backup-transponder should the first transponder be faulty and need to be turned off.

The resolution to the captain's safely maintaining control over the aircraft is to require a daisy-chain of three, or two if deemed adequate, transponders on all commercial aircraft, only one transponder being operational at any given time. This way the pilot maintains the necessary control to turn off one or even two faulty transponders in the extremely rare case that one or even two transponders overheats or transmits dangerously incorrect information on the same aircraft and on the same flight. The pilot also needs control over whether any transponder is turned on or is turned off when the aircraft is on the ground.

In 1978, "Aeronautical Radio, Inc." (ARINC) developed an "aircraft communications and reporting system" (ACARS), a data-link system that enables ground stations (airports, aircraft maintenance bases, etc.) to upload data such as flight plans and download data such as fuel quantity from a "flight management system" (FMS) by way of an onboard "communications management unit" (CMU). ACARS is the "gold standard" used by all United States commercial air carriers.

The ARINC individual "429" system is Aeronautical Radio, Inc.'s technical standard for the avionics data-bus used on all commercial and transport aircraft. The ARINC 429 data-bus defines the physical and electrical data-bus and data protocol that supports an aircraft's avionics. The ARINC 429 data-bus is also known as the aircraft's "touchdown-relay" and is physically located in the aircraft's electronics and equipment bay.

Earlier this year a network of 66 Iridium satellites was placed in orbit that will enable complete coverage for commercial aircraft flight tracking. The new technology, an automatic dependent surveillance broadcast, or ADS-B, is at the heart of a new worldwide air traffic control system provided by McLean, Va. based Aireon. ADS-B will be required on all commercial aircraft operating in and out of the United Stated starting on Jan. 1, 2020.

If a commercial aircraft loses its transponder after Jan. 1, 2020 it will also lose its ADS-B connection and, therefore, it will disappear from the new global tracking system, just as MH370 disappeared from the old tracking system.

FIG. 1 is a prior art one-transponder system, showing the transponder turned on by someone in the flight deck while the aircraft is on the ground and is preparing for takeoff. Following the flowchart's downward sequence in the left hand column of FIG. 1, when the aircraft is in the air the transponder may be turned off by anyone in the flight deck making the aircraft invisible to air traffic control. Turning to the flowchart's downward sequence of the right hand column of FIG. 1, when the aircraft is on the ground the transponder may also be turned off by anyone in the flight deck making the aircraft invisible to air traffic control. This is the prior art system that MH370 used that allowed someone in the aircraft's flight deck to turn off the first transponder which led to the aircraft becoming invisible to air traffic control and thus becoming lost, resulting in 239 deaths. MH370 had a second transponder, but it was not turned on after the first transponder was turned off.

Figure 2:
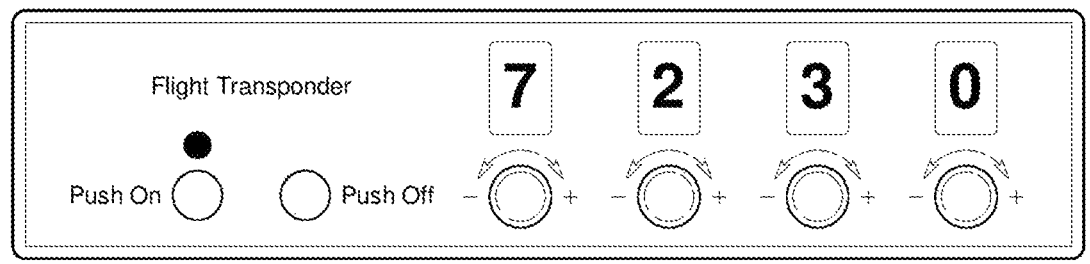
FIG. 2 is a representation of a prior art one-transponder system having manual push-on/push-off controls and rotary controls for inputting a squawk-code.

FIG. 2 is a representation of a prior art one-transponder system having push-on/push-off controls and rotary controls for inputting the four-digit squawk-code. In FIG. 2, the transponder is shown turned on.

Figure 3:
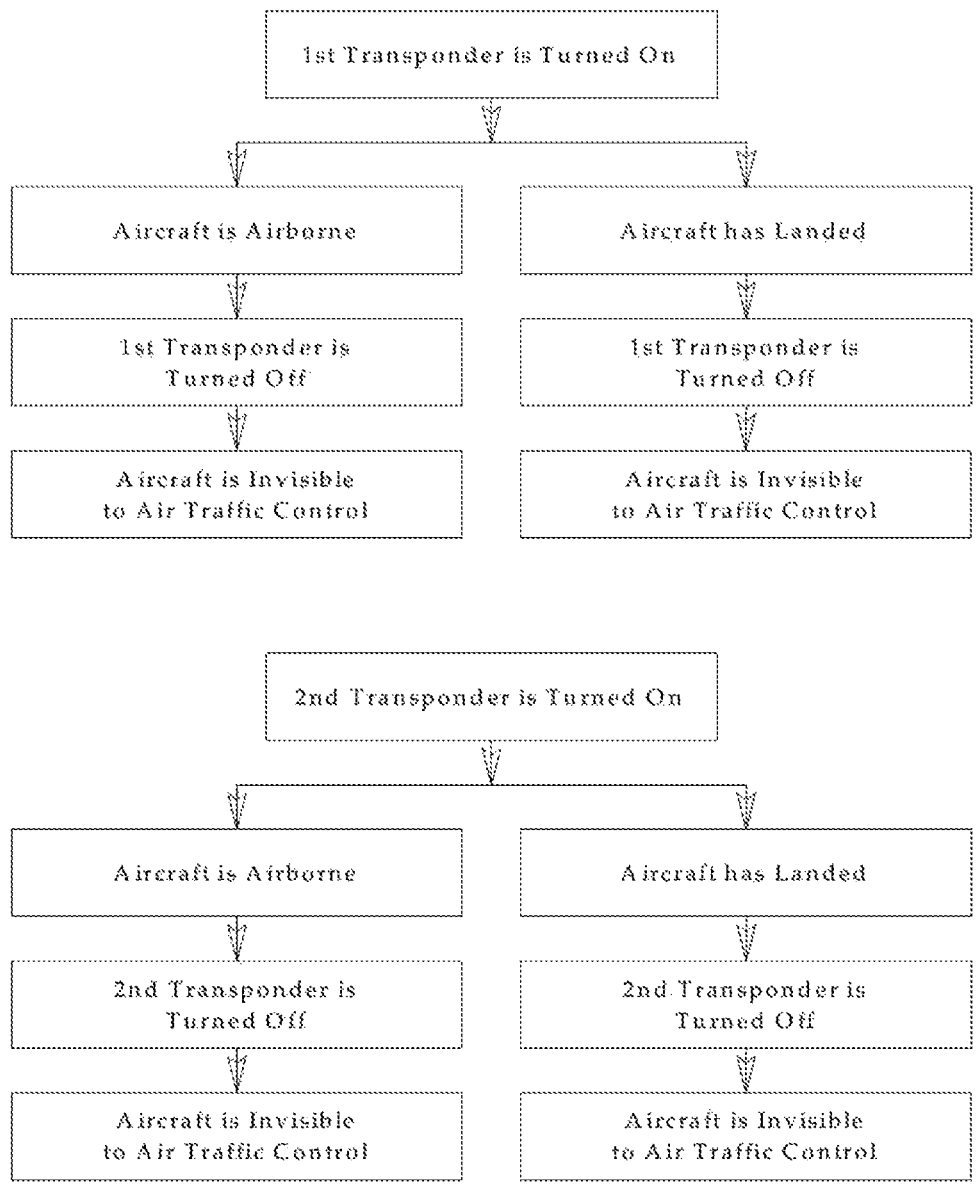
FIG. 3 shows two flowcharts diagraming the sequence of a prior art two-transponder system, whether the aircraft is airborne or has landed.

FIG. 3 is a flowchart of a prior art two-transponder system having two transponders such as the transponder shown in FIG. 2. The flowchart begins with someone in the flight deck while the aircraft is on the ground and is preparing for takeoff turning on the first transponder. Following the flowchart's downward sequence in the left hand column of FIG. 3, when the aircraft is in the air the first transponder may be turned off by anyone in the flight deck making the aircraft invisible to air traffic control. Turning to the flowchart's downward sequence of the right hand column of FIG. 3, when the aircraft is on the ground the transponder may also be turned off by anyone in the flight deck making the aircraft invisible to air traffic control. The second or lower flowchart of FIG. 3 follows the exact same sequence of turning on and turning off the independent second transponder. A two-transponder system is better that a one-transponder system because it provides a backup or second transponder should the first transponder need to be turned off due to becoming faulty. The two-transponder system did not allow air traffic control to continue tracking MH370 as someone in the flight deck of the aircraft did not turn on the second transponder after turning off the first transponder. A weakness of this prior art two-transponder system is that both transponders may be turned off for various reasons causing the aircraft to become invisible to air traffic control and therefore lost.

Figure 4:
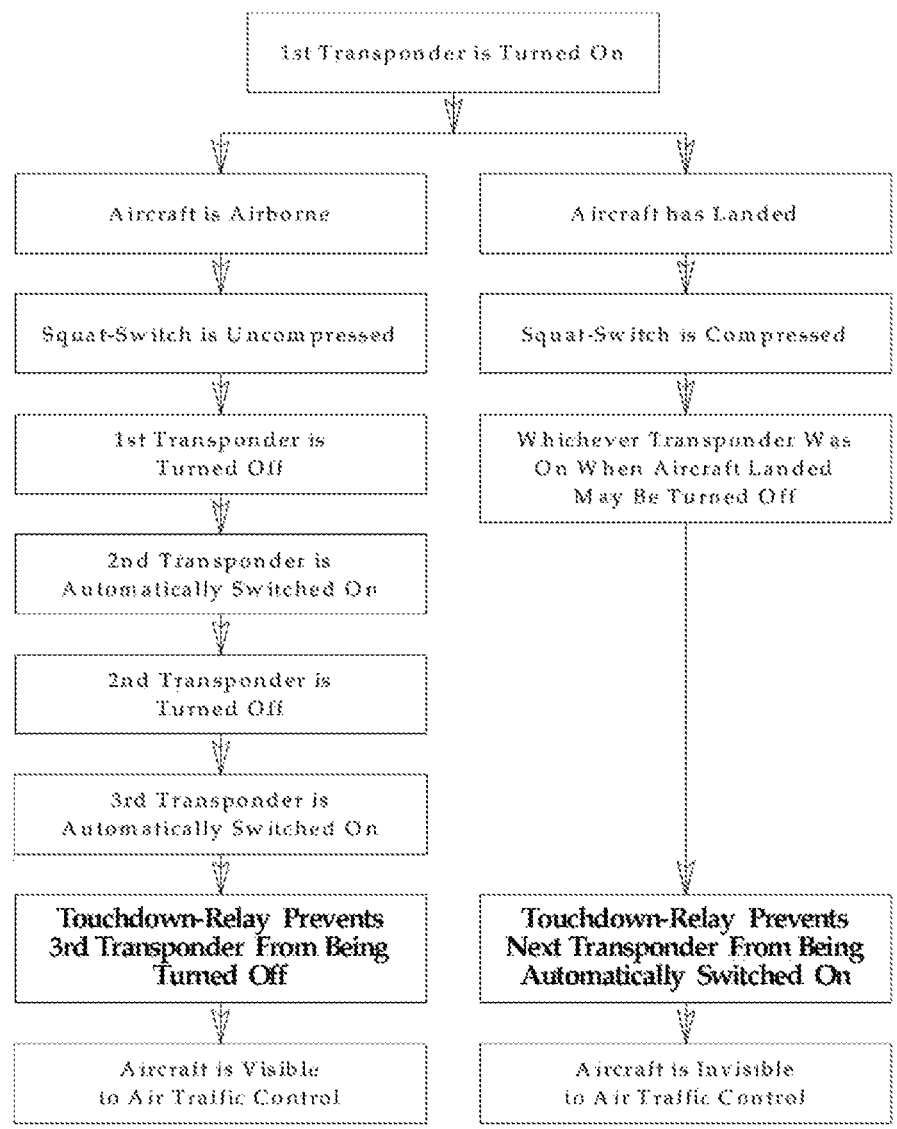
FIG. 4 is a flowchart diagraming the sequence of the present disclosure's three-transponder system, whether the aircraft is airborne or has landed, that prevents the aircraft from becoming invisible to air traffic control because the third transponder cannot be turned off while the aircraft is airborne.

FIG. 4 is a diagrammatic representation of the present disclosure's three-transponder system showing the first transponder turned on by someone in the flight deck while the aircraft is on the ground and is preparing for takeoff. Following the flowchart's downward sequence in the left hand column of FIG. 4, when the aircraft is in the air and the squat-switch is uncompressed the first transponder may be turned off by anyone in the flight deck. Should the first transponder be turned off, the second transponder will be automatically switched on. Should the second transponder be turned off, the third transponder will be automatically switched on and the third transponder cannot be turned off by anyone in the flight deck because the touchdown-relay confirms the aircraft is in the air and will not allow the aircraft to become invisible to air traffic control. Turning to the flowchart's downward sequence of the right hand column of FIG. 5, when the aircraft is on the ground and the squat-switch is compressed whichever transponder was on when the aircraft landed may be turned off by anyone in the flight deck. The next transponder in the sequence of transponders will not be automatically switched on because the touchdown-relay confirms the aircraft is on the ground and prevents any additional transponder from being automatically switched on therefore the aircraft will become invisible to air traffic control. The various automatic switching among transponders and whether individual transponders can or cannot be turned off is controlled and regulated by simple electronic switches and circuitry among the individual smart-transponders. The odds of all three transponders overheating or malfunctioning on the same aircraft and on the same flight appears to be a risk well within FAA and aircraft industry safety criterions.

Figure 5:
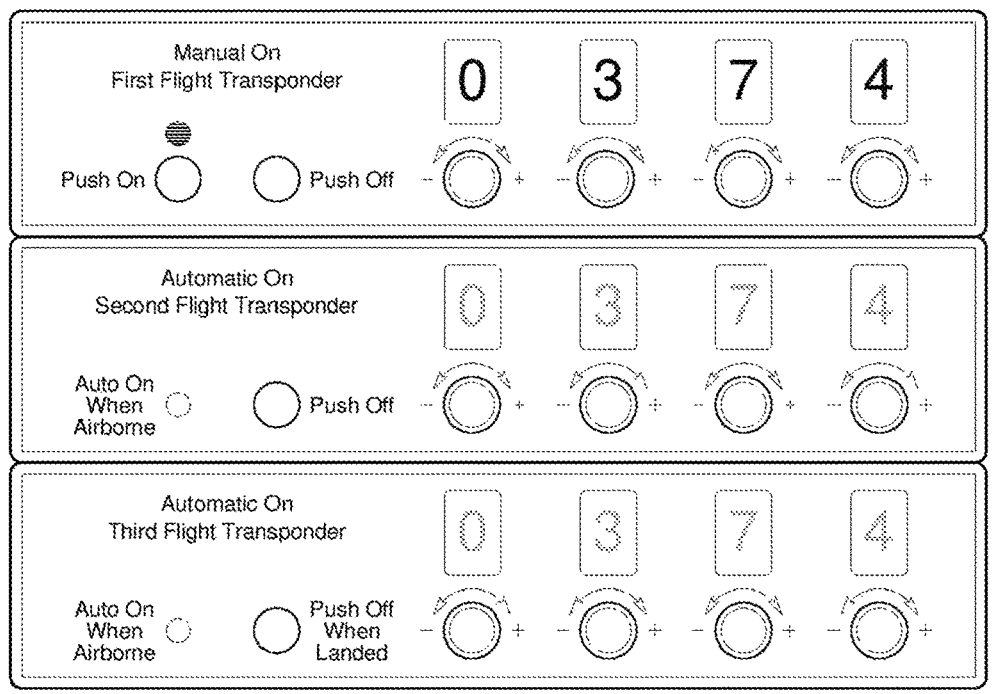
FIG. 5 is a representation of the three-transponder system of the present disclosure. The first transponder has push-on/push-off controls and rotary controls for inputting a squawk-code, the second transponder has auto-on-when-airborne/push-off controls and rotary controls for inputting a squawk-code, and the third transponder has auto-on-when-airborne/push-off-when-landed controls and rotary controls for inputting a squawk-code.

FIG. 5 is a representation of the first transponder of the present disclosure's three-transponder system having push-on/push-off controls and rotary controls for inputting the four-digit squawk-code, combined with a second transponder having auto-on-when-airborne/push-off controls and rotary controls for inputting the four-digit squawk-code, combined with a third transponder having auto-on-when-airborne/push-off-when-landed controls and rotary controls for inputting the four-digit squawk-code. The second transponder is automatically switched on if the first transponder is turned off when the aircraft is in the air. The third transponder is automatically switched on if the second transponder is turned off when the aircraft is in the air. Someone in the flight deck can push the push-off-when-landed control on the third transponder, however the touchdown-relay will not comply and will not allow the third transponder to actually be turned off until the aircraft has landed and the squat-switch is compressed. Once the touchdown-relay detects that the aircraft has landed, the third transponder may be turned off. In FIG. 5, the first transponder is shown turned on, the second transponder is shown turned off and the third transponder is also shown turned off. When a pilot turns the first transponder on and enters a four-digit squawk code, the code will automatically be entered into the second and third transponders.

Figure 6:
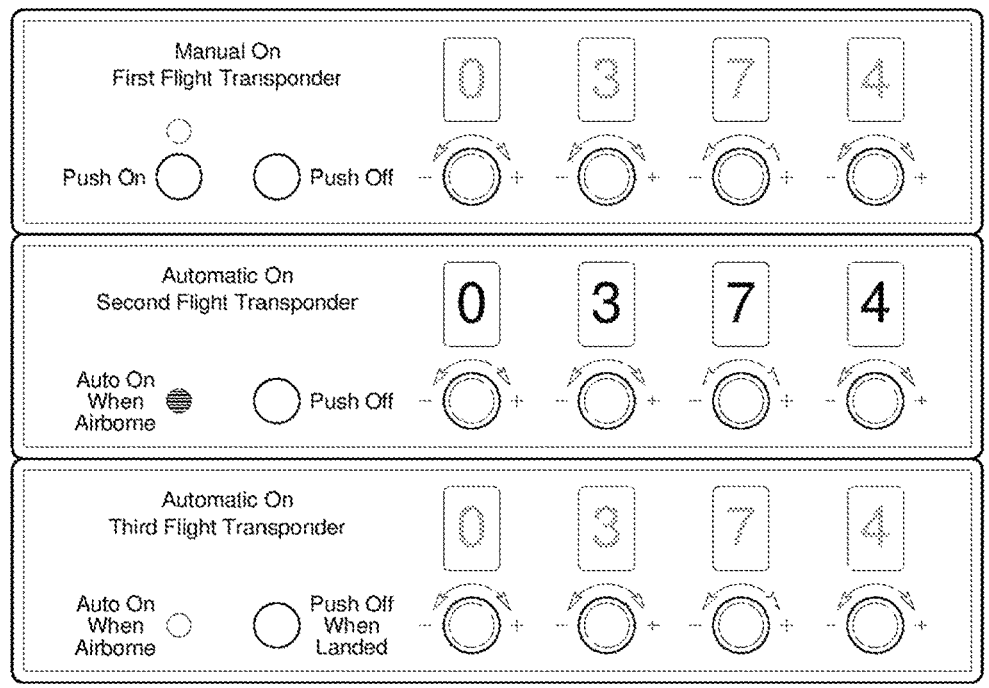
Figure 7:
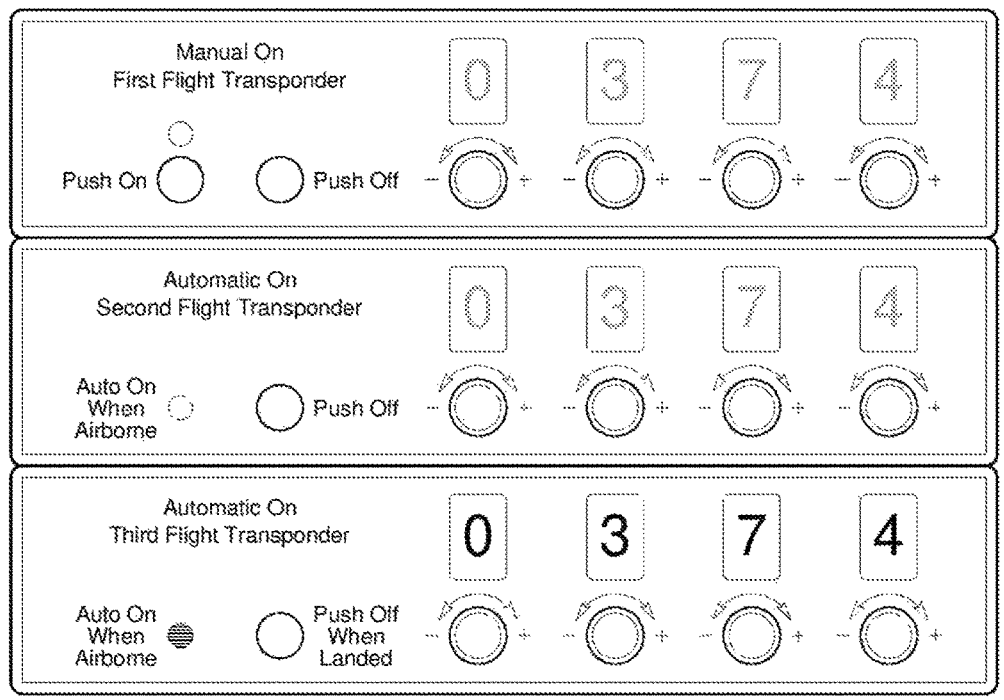

FIGS. 5, 6 and 7 show the sequence of the status of the present disclosure's three-transponder system where in FIG. 5 the first transponder was turned on. In FIG. 6 the first transponder may be turned off because it overheated, was sending bad information or was simply turned off by someone in the secure flight deck causing the second transponder to automatically switch on. In FIG. 7 the second transponder is also turned off for any of the same reasons causing the third transponder to automatically switch on and the third transponder cannot be turned off while the aircraft is in the air. In the case of a nefarious person in the flight deck desiring to make the aircraft invisible to air traffic control, the automatic-on third transponder in the daisy-chain system of three transponders will not actually switch off even if turned off in the flight deck while the touchdown-relay determines that the aircraft is still in the air. Once the touchdown-relay determines that the aircraft is on the ground the third transponder may be turned off.

FIG. 5 is a representation of the present disclosure's three-transponder system showing the first transponder has been turned on.

FIG. 6 is a representation of the present disclosure's three-transponder system showing the first transponder has been turned off and the second transponder has automatically switched on.

FIG. 7 is a representation of the present disclosure's three-transponder system showing the first transponder has been turned off and the second transponder was automatically switched on, but it also has been turned off and the third transponder has automatically switched on.

Figure 8:
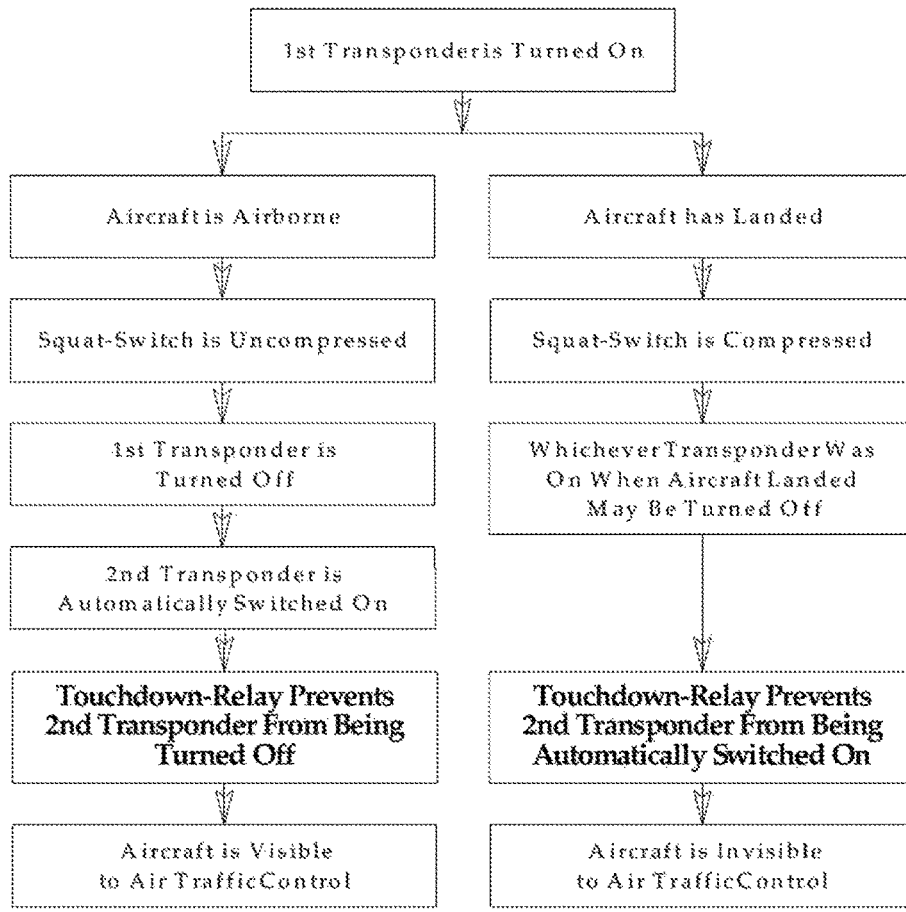
FIG. 8 is a flowchart diagraming the sequence of the present disclosure's two-transponder system, whether the aircraft is airborne or has landed, that prevents the aircraft from becoming invisible to air traffic control because the second transponder cannot be turned off while the aircraft is airborne.

FIG. 8 is a representation showing the present disclosure's two-transponder system showing the first transponder turned on by someone in the flight deck while the aircraft is on the ground and is preparing for takeoff. Following the flowchart's downward sequence in the left hand column of FIG. 8, when the aircraft is in the air and the squat-switch is uncompressed the first transponder may be turned off by anyone in the flight deck. Should the first transponder be turned off, the second transponder will be automatically switched on and the second transponder cannot be turned off by anyone in the flight deck because the touchdown-relay confirms the aircraft is in the air and will not allow the aircraft to become invisible to air traffic control. Turning to the flowchart's downward sequence of the right hand column of FIG. 8, when the aircraft has landed and the squat-switch is compressed, whichever transponder was on when the aircraft landed may be turned off by anyone in the flight deck. The next transponder in the sequence of transponders will not be automatically switched on because the touchdown-relay confirms the aircraft is on the ground and prevents any additional transponder from being turned on therefore the aircraft will become invisible to air traffic control. The odds of two transponders overheating or malfunctioning on the same aircraft and on the same flight appears to be a risk well within FAA and aircraft industry safety criterions.

Figure 9:
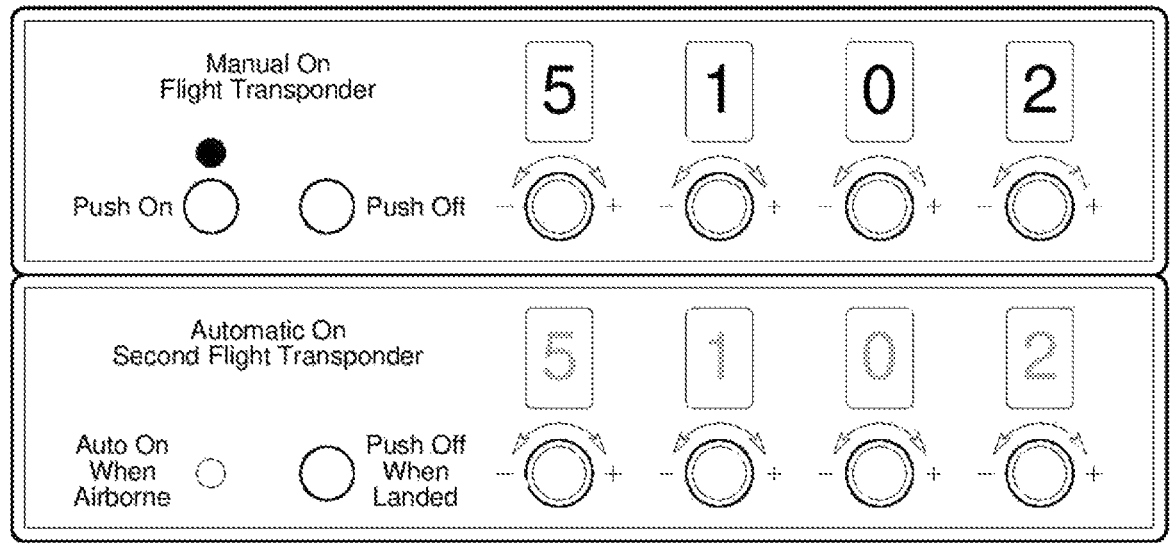
FIG. 9 is a representation of a two-transponder system of the present disclosure. The first transponder has push-on/push-off controls and rotary controls for inputting a squawk-code and a second transponder having auto-on-when-airborne/push-off-when-landed controls and rotary controls for inputting a squawk-code.
Figure 11:
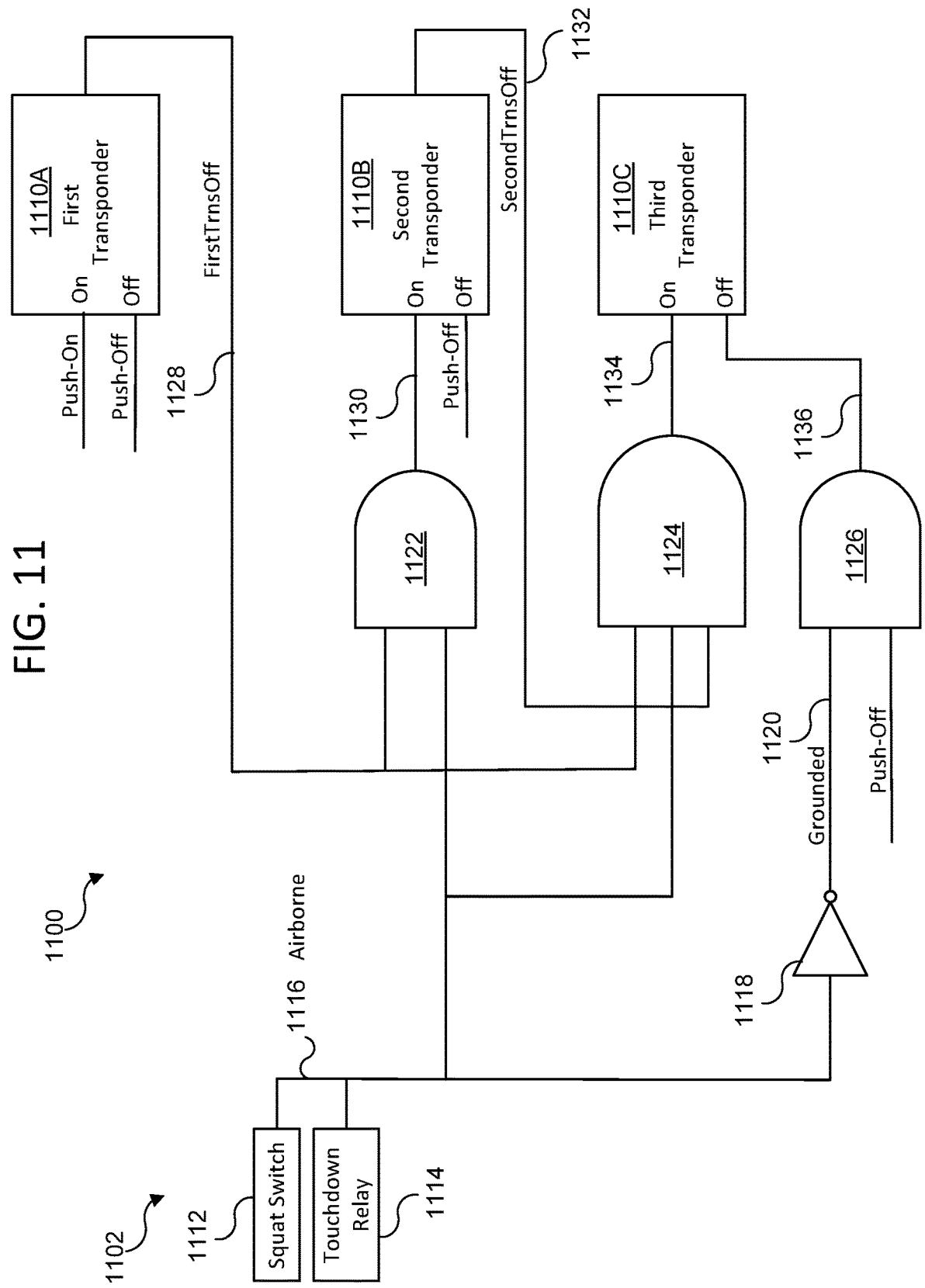

FIG. 9 is a representation of the first transponder of the present disclosure's two-transponder system having push-on/push-off controls and rotary controls for inputting the four-digit squawk-code, combined with the second transponder having auto-on-when-airborne/push-off-when-landed controls and rotary controls for inputting the four-digit squawk-code. The second transponder is automatically switched on if the first transponder is turned off when the aircraft is in the air. Someone in the flight deck may push the second transponder's push-off-when-landed control, however the touchdown-relay will not comply and will not allow the second transponder to actually be turned off until the aircraft has landed and the landing gear is compressed. Once the touchdown-relay detects that the aircraft is on the ground, the second transponder may be turn off. In FIG. 11, the first transponder is shown turned on and the second transponder is shown turned off. When a pilot turns the first transponder on and enters a four-digit squawk code, the code will automatically be entered into the second transponder.

Figure 10:
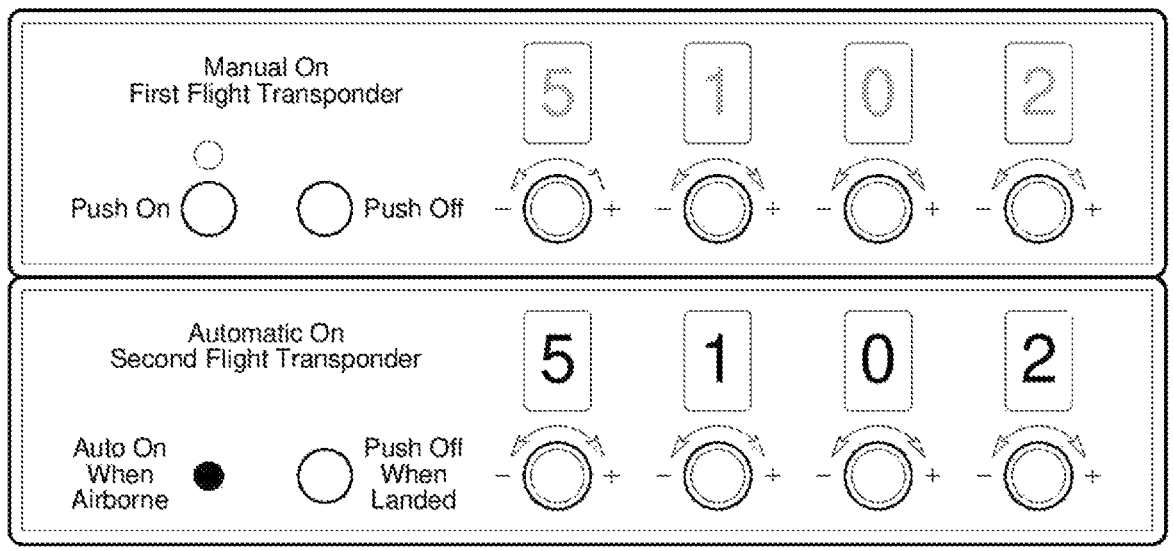

FIGS. 9 & 10 show the sequence of the status of the present disclosure's two-transponder system where in FIG. 9 the first transponder is turned on and in FIG. 10 the first transponder is turned off because it overheated or was sending bad information causing the second transponder to automatically switch on and the second transponder cannot be turned off while the aircraft is in the air. In the case of a nefarious person in the flight deck desiring to make the aircraft invisible to air traffic control, the auto-on-when-airborne second transponder in the daisy-chain system of two transponders will not actually turn off even if turned off in the flight deck while the touchdown-relay determines that the aircraft is still in the air. Once the touchdown-relay determines that the aircraft is on the ground the second transponder may be turned off. In FIG. 9, the first transponder is shown turned on and the second transponder is shown turned off. In FIG. 10, the first transponder is shown turned off and the second transponder is shown turned on.

The simplicity of operation of a three-transponder or a two-transponder system is preferred to be no more complicated than the operation of prior art transponder systems. In prior art examples a transponder may be turned off in one single pilot-input operation. In the present disclosure when the aircraft is on the ground, the squat-switch recognizes that the landing gear is compressed and will allow the pilot to turn off whichever transponder was on with one single pilot-input control. When the aircraft is airborne, the squat-switch recognizes that the landing gear is uncompressed and will allow the pilot to turn off the first and second transponders in a three-transponder system or the first transponder of a two-transponder system each with one single pilot-input control. Having one-transponder always turned on prevents an airborne commercial aircraft from becoming invisible to air traffic control and thus becoming lost, as happened with flight MH370.

FIG. 11 illustrates a circuit diagram of transponder control circuit 1100 for controlling multiple transponders to prevent aircraft from becoming invisible to air traffic control. In this example, there are three transponders 1110A, 1110B and 1110C, collectively referred to as transponders 1110. The transponders 1110 each have a power on input (On) and a power off input (Off) that turn the transponder on and off respectively. When the transponder is off, the transponder may be in a sleep or standby mode such that a portion of the circuit is active to monitor the power input (On). The circuit 1100 further includes an airborne circuit 1102 with connections to the squat switch 1112 and the touchdown relay 1114 on board the aircraft as described above. The airborne circuit 1102 uses the squat switch 1112 and the touchdown relay 1114 together to provide an airborne signal 1116 that is asserted when the aircraft is airborne. The airborne signal 1116 may be produced by just the squat switch 1112, the touchdown relay 1114, or a combination of the two depending on the aircraft configuration. The airborne signal 1116 may be applied to an inverter 1118 to produce a grounded signal 1120 that indicates the aircraft has landed and is on the ground. The circuit 1100 further includes logic to turn on and off the transponders 1110 as described further below. In this example, the circuit 1100 includes three logical AND gates 1122, 1124, 1126 that turn the second transponder 1110B on, and turn the third transponder 1110C on and off.

Again referring to FIG. 11, the operation of the circuit 1100 to control the transponders from being turned off while airborne will now be described. The circuit 1100 controls the transponders to prevent aircraft from becoming invisible to air traffic control by insuring that one transponder is always turned on when the aircraft is airborne as described above with reference to FIGS. 5, 6, and 7. As described above with reference to FIG. 5, the first transponder 1110A may be turned on and off with the Push-on and the Push-off controls. The Push-on and Push-off controls of the first transponder 1110A may turn on and off the first transponder 1110A by someone on the flight deck whether the aircraft is airborne or grounded. If the first transponder is turned off by someone pressing the Push-off control while the aircraft is in the air, the circuit 1100 turns on the second transponder 1110B via the AND gate 1122. When the first transponder 1110A turns off, meaning it is in standby or no longer transmitting, the first transponder 1110A asserts a FirstTrnsOff signal 1128. With the FirstTrnsOff signal 1128 asserted, and if the aircraft is airborne, the two inputs to AND gate 1122 will be high causing the output 1130 to be asserted at the On input of the second transponder 1110B causing the second transponder 1110B to turn on. The second transmitter will now be turned on as shown in FIG. 6.

Again referring to FIG. 11, if the second transponder 1110B is turned off by someone pressing the Push-off control while the aircraft is in the air, the circuit 1100 turns on the third transponder 1110C via the AND gate 1124. When the second transponder 1110B turns off, the second transponder 1110B asserts a SecondTrnsOff signal 1132. With the SecondTrnsOff signal 1132 asserted, the FirstTrsOff signal 1128 asserted (the first transponder 1110A is also off), and if the aircraft is airborne, the three inputs to AND gate 1124 will be high causing the output 1134 to be asserted to the On input of the third transponder 1110C to turn on the third transponder 1110C. Now that the third transponder 1110C is on, it can't be turned off "unless the aircraft is grounded" to prevent the aircraft from becoming invisible to air traffic control. When the aircraft is airborne and someone activates the Push-off control of the third transponder 1110C the third transponder will not turn off. If the aircraft is grounded (signal 1120 is high), and someone activates the Push-off control of the third transponder, the inputs to the AND gate 1126 will all be activated and AND gate 1126 will assert output 1136 to turn the third transponder 1110C off.

Figure 15:
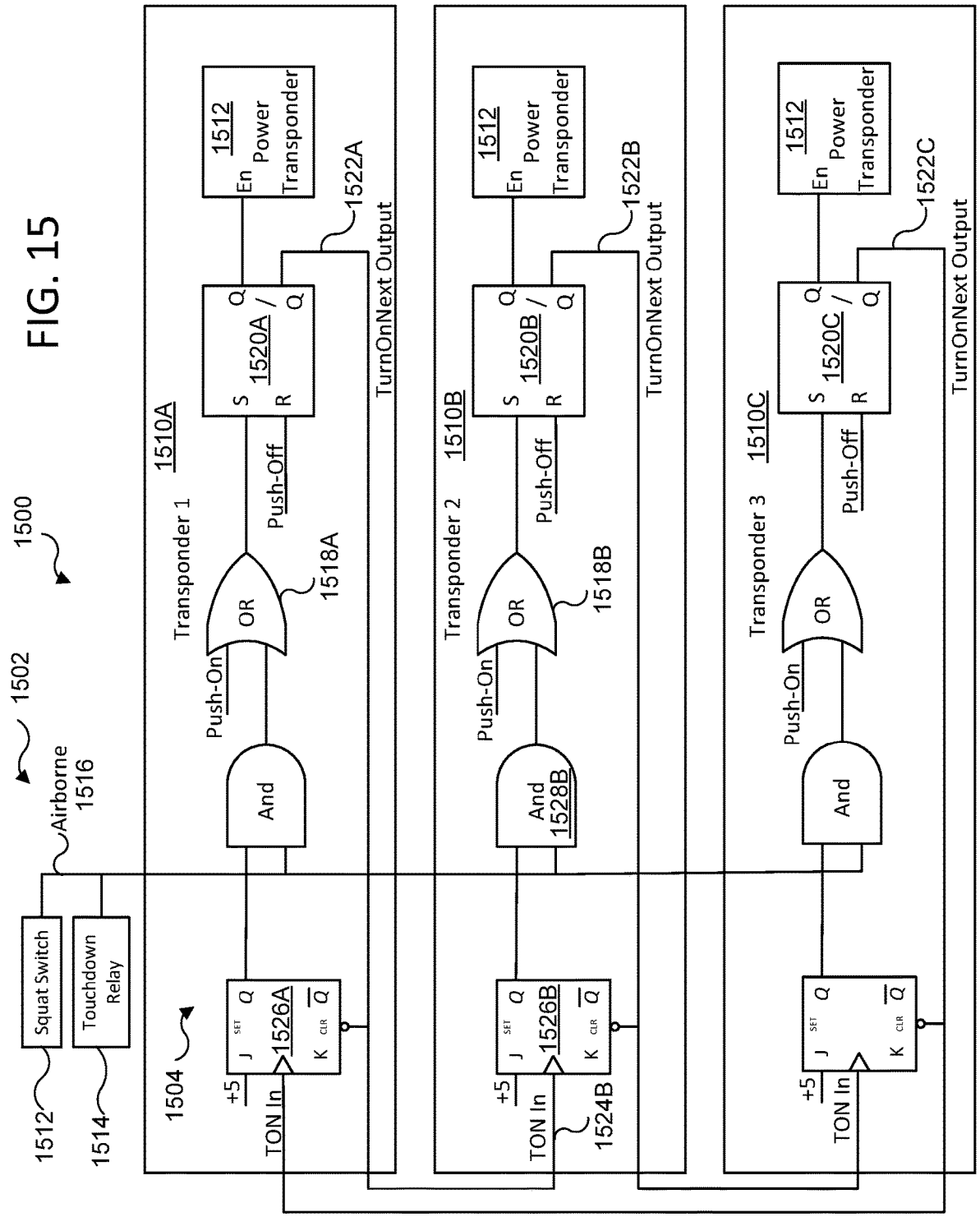
FIG. 15 illustrates a diagram for a transponder control circuit that controls multiple transponders in a circular daisy chain to prevent aircraft from becoming invisible to air traffic control.
Figure 16:
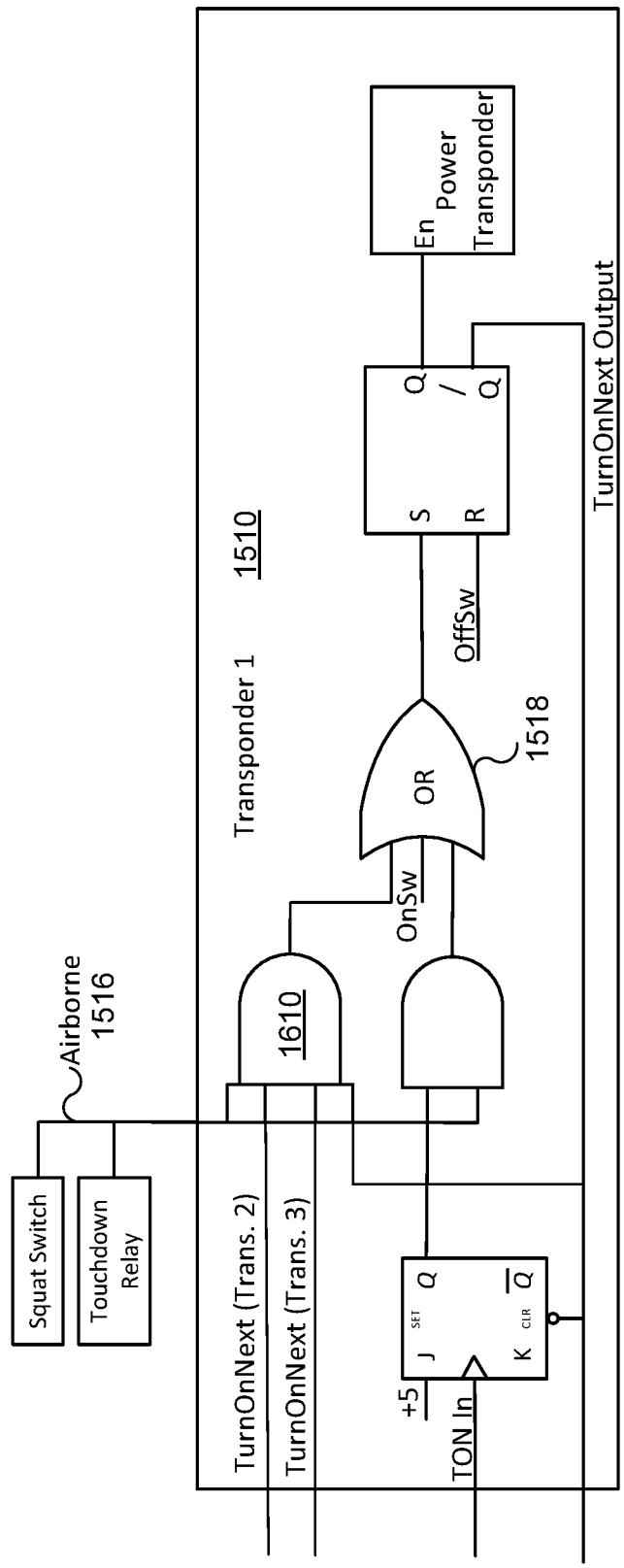
FIG. 16 illustrates a diagram of a transponder control circuit for controlling transponders in a circular daisy chain which includes circuitry to automatically turn on a transponder if the aircraft become airborne with all the transponders turned off.

The circuit 1100 in FIG. 11 may be modified for a two transponder system such as shown in FIGS. 9 and 10 by removing the AND gate 1122 and the second transponder 1110B. The circuit functionality shown in FIG. 15 to turn on the transponder if the aircraft becomes airborne without a transponder being active could be added to the circuit shown in FIG. 11. This modification could be accomplished with by adding an OR gate and a 4-input AND gate connected similar as shown in FIG. 16. This modification amounts to a minor design change and is not shown here for brevity.

Figure 12:
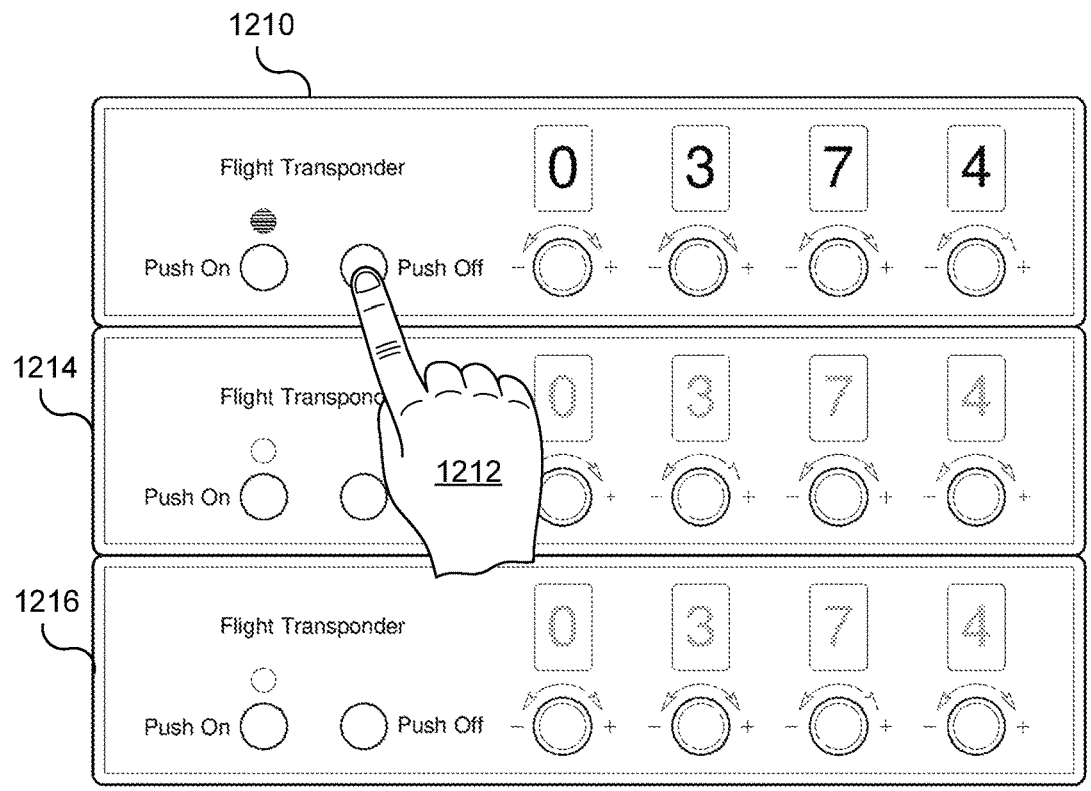
FIG. 12 is a representation of the three-transponder system with the transponders connected in a circular daisy chain.
Figure 13:
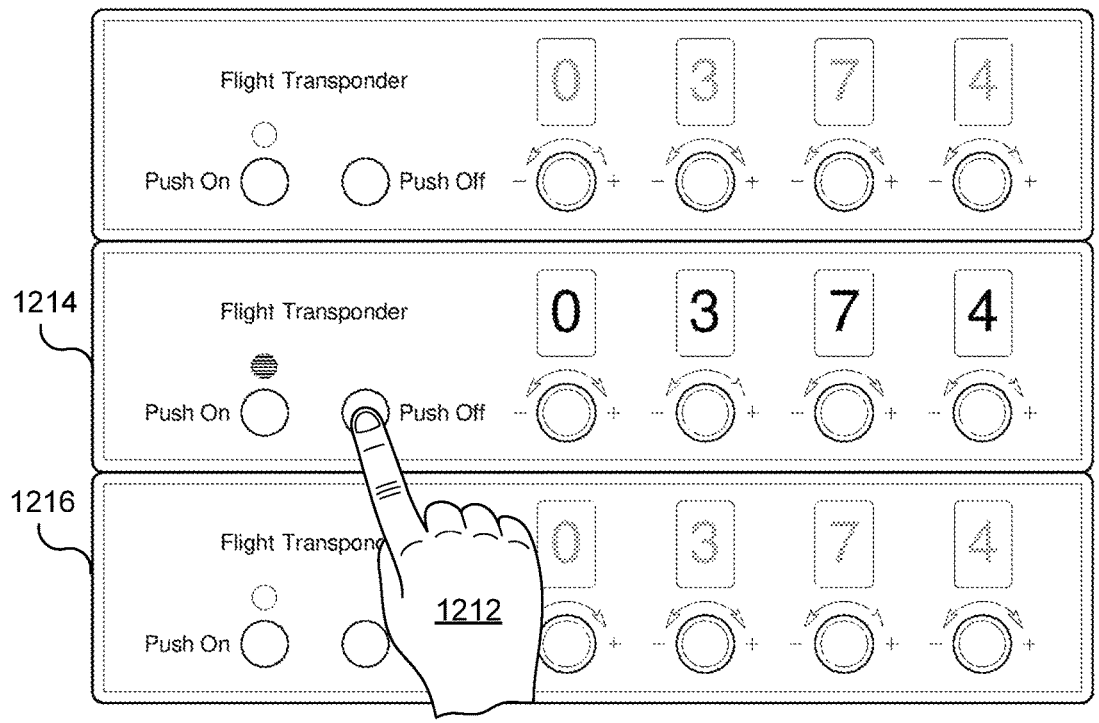
Figure 14:
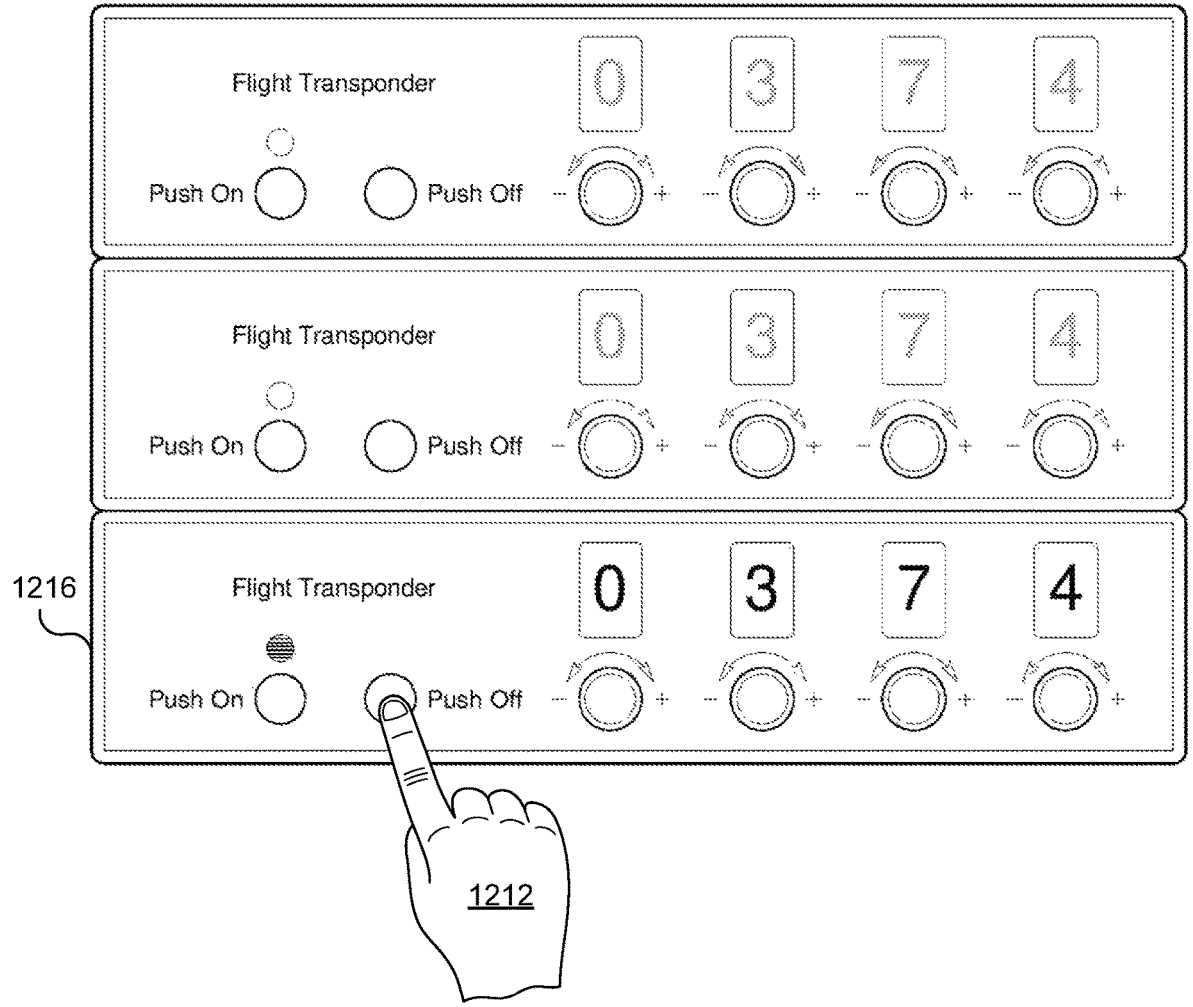

FIGS. 12-14 illustrate another implementation of the invention with multiple transponders to prevent aircraft from becoming invisible to air traffic control when airborne. In this implementation the transponder system has multiple transponders that are essentially identical connected in a daisy chain as described below. In the example shown in FIGS. 12-14, there are three transponders connected in the system. Each transponder may have push-on/push-off controls and rotary controls for inputting the four-digit squawk-code as described above. In contrast to the prior art the transponders are connected in a daisy chain or circular manner. Further, the transponders include circuitry to ensure the next transponder in the daisy chain is automatically switched on if a previous transponder is turned off when the aircraft is airborne. Someone in the flight deck can push the push button control on the transponders and the transponder will turn off, however the next transponder will be automatically turned on until the aircraft has landed and the squat-switch is compressed. Once the circuit detects that the aircraft has landed, all the transponders may be turned off.

FIGS. 12, 13 and 14 illustrate an implementation of a three transponder system as the three transponders are turned on and off. FIG. 12 shows the first transponder 1210 being turned off by a person 1212 on the flight deck. Alternatively, the transponder 1210 may be turned off automatically by other means. In each instance described herein where a transponder is described as being turned off, the transponder may be manually or automatically turned off. The first transponder may be turned off because it overheated, was sending bad information or was simply turned off by someone in the secure flight deck as described above. When the first transponder 1210 is turned off, whether manually or automatically, the second transponder 1214 is automatically switched as shown in FIG. 13. The second transmitter 1214 is turned on by internal or external circuitry such as shown in FIG. 15 and described below. If the Push-Off button of the second transponder 1214 is then pressed as shown in FIG. 13, then the second transponder 1214 is turned off, and the third transponder 1216 is automatically switched on as shown in FIG. 14. In the case of a person in the flight deck turns off the third transponder 1216, or the transponder is turned off automatically, the first transponder 1212 will automatically turn on as shown in FIG. 12 when the circuit determines that the aircraft is still in the air. When aircraft is on the ground, then all the transponders, including the one remaining turned on, may be turned off.

FIG. 15 illustrates a circuit diagram of circuit 1500 for controlling transponders as described above with reference to FIGS. 12-14 to prevent aircraft from becoming invisible to air traffic control. In this example, the circuit 1500 includes three transponders 1510A, 1510B and 1510C, collectively referred to as transponders 1510. The transponders 1510 each have a power transponder block 1512 with a power on enable (En). The power transponder block 1512 turns the transponder 1500 on and off when the EN input is asserted. When the power transponder block 1512 is off, the transponder may be in a sleep or standby mode such that the remaining portion of the circuit 1500 is still active. The circuit 1500 further includes an airborne circuit 1502 with connections to a squat switch 1512 and the touchdown relay 1514 on board the aircraft as described above. The squat switch 1512 and the touchdown relay 1514 together are referred to herein as an airborne circuit and provide an airborne signal 1516 that is asserted when the aircraft is airborne. The airborne signal 1516 may be produced by just the squat switch 1512, the touchdown relay 1514, or a combination of the two depending on the aircraft configuration.

The circuit 1500 further includes a transponder control circuit 1504 with logic to turn on and off the transponders 1510 as described further below. In this example, the transponder control circuit 1504 includes for each transponder a J-K flip-flop, a logical AND gate, a logical OR gate and an SR latch or flip-flop. An output of the SR flip-flop drives the EN input of the power transponders 1512 to turn the transponders on and off. The logic elements of the transponder control circuit represent one implementation and should not be interpreted to limit the scope of the claims. Other combinations of logic gates may be used to provide the same structure and operation as described.

Again referring to FIG. 15, the operation of the transponder control circuit 1504 to control the transponders will now be described. The circuit 1504 controls the power to the transponders to ensure that one transponder is always turned on when the aircraft is airborne as described above with reference to FIGS. 12-14. As described above, the transponders 1510 may be turned on and off with the Push-On and the Push-Off controls. The Push-On control for the first transponder 1510A is connected to an input of the logical OR gate 1518A. When the Push-On control is asserted the OR gate 1518A asserts the output of the OR gate 1518A. The output of the OR gate 1518A is connected to the S input of the SR latch 1520A. When the S input is asserted by the output of the OR gate 1518A, the SR latch 1520A is set, meaning the latch is set to contain a logical one. When set, the Q output of the SR latch (Q) goes high. The Q output is connected to the enable (EN) of the power transponder 1512. This allows the first transponder 1510A to be turned on with the Push-On control. The Push-Off control is connected to the reset (R) input of the SR latch 1520A. If the Push-Off control is activated, the R input is asserted to reset the latch which turns off the power to the transponder 1510A. In addition, if a transponder 1510A is turned off by someone pressing the Push-off control while the aircraft is in the air, the circuit 1500 turns on a subsequent transponder 1512 via the TurnOnNext signal 1522A from the /Q output of the SR latch 1520A. The second and third transponders 1510B, 1510C operate similarly as described for the first transponder 1510A.

Again referring to FIG. 15, a TurnOnNext output signal from each transponder is provided to a TurnOnNext (TON) input of the next transponder in the daisy chain to turn on the next transponder when a transponder is turned off and the aircraft is airborne. In the example of FIG. 15, the TurnOnNext signal 1522A from the /Q output of the SR latch 1520A on the first transponder 1510A is provided to a TurnOnNext input 1524B of the second transponder 1510B. The TurnOnNext input 1524 is connected to the clock input of a J-K flip-flop 1526B. The J input of the J-K flip-flop 1526B is connected to a positive supply voltage (indicated as +5 volts). The TurnOnNext signal 1522A connected to the J input provides a positive transition when the previous transponder is turned off. This positive transition sets the J-K flip-flop 1526B to a logical one. When set to a logical one, the Q output of the J-K flip-flop is asserted. The Q output is connected to an input of the AND gate 1528B. Also connected to an input of the AND gate 1528B is the Airborne signal 1516. If the aircraft is airborne (Airborne signal 1515 is asserted) and the Q output is high indicating the previous transponder was turned off, then the power to the current transponder is turned on by the output of the OR gate 1518B being asserted in the same manner as described above. The TurnOnNext outputs 1522 are also connected to the clear inputs (CLR) of the J-K flip-flops 1528 to reset the J-K flip-flop after the SR flip-flop is set. This prevents the J-K flip-flop does not continue to send a signal to turn on the transponder so that the transponder can later be turned off.

The transponders 1520 are connected in a loop or circular daisy chain. In this example the sequence is—transponder 1 1510-transponder 2 1510B—transponder 3 1510C, where transponder 3 is connected back transponder 1 1510A. The TurnOnNext output signal of each transponder is connected to the TurnOnNext input of the next transponder. The description above focused on just the first to second transponder transition. Transitions from transponder 2 to transponder 3, or from transponder 3 to transponder 1 would operate similarly. For example, if the second transponder is turned off via the Push-Off input to the SR flip-flop 1520B, then the third transponder 1510C would be turned on in the same manner described via the TurnOnNext output 1522B.

A potential problem of the above circuit is that the aircraft could take-off in a high jack situation without any transponder turned on. To overcome this potential problem, the circuit 1500 could be modified to automatically turn one or more transponders if the aircraft becomes airborne without a transponder being active. This can be accomplished by the circuit modification shown in FIG. 16. The transponder circuit in FIG. 16 is similar to the above transponders 1510 in FIG. 15, but with the addition of a second AND gate 1610. The AND gate 1610 has four inputs. Three inputs are connected to the TurnOnNext outputs (1522A, 1522B and 1522C in FIG. 15) of all three transponders and the fourth input is connected to the Airborne signal 1516. Thus, when all three transponders are turned off and the aircraft is airborne, the output of the AND gate 1610 will assert a third input to the OR gate 1518 to turn the transponder on. This circuit cold be connected on just one, or on all, of the transponders to turn on one or all of the transponders as described. If the aircraft becomes airborne and all the transponders are turned off, the transponders connected as shown will automatically be turned on.

Figure 17:
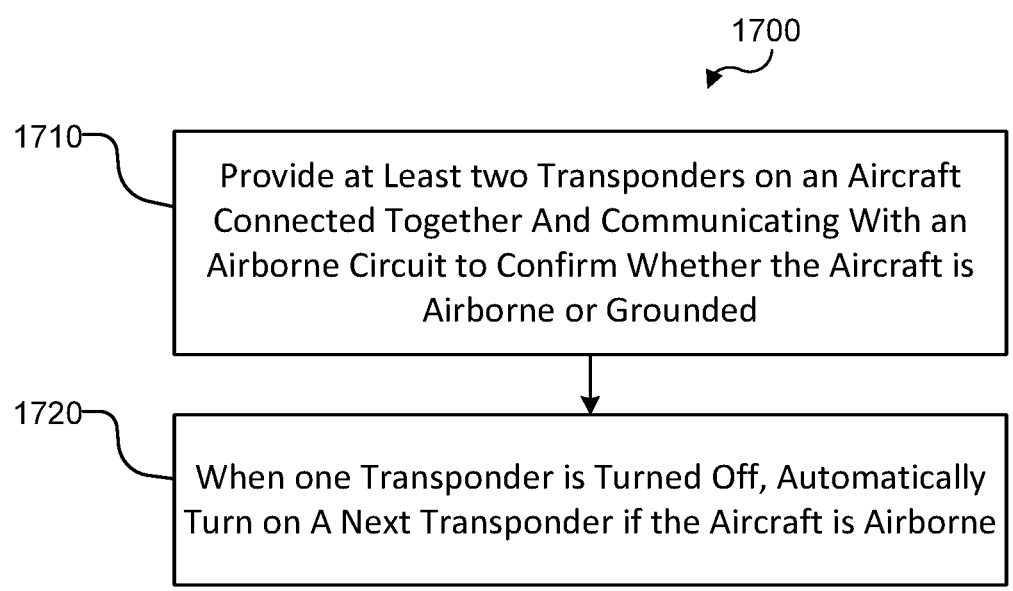
FIG. 17 shows a flow diagram for a method for automatically turning on an aircraft transponder to prevent the aircraft from becoming invisible to air traffic control when it is airborne.

FIG. 17 shows a flow diagram for a method 1700 for automatically turning on an aircraft transponder to prevent the aircraft from becoming invisible to air traffic control when it is airborne. First, in step 1710, provide at least two transponders on an aircraft that are connected. In one implementation, the transponders are arranged in a sequence with the last transponder not allowing the unit to be turned off unless the aircraft is grounded. This implementation is described above with reference to FIGS. 5-7. In another implementation, the transponders are arranged in a circular daisy chain as described above with reference to FIGS. 12-14. In step 1720, when one transponder is turned off, the next transponder is automatically turned on if the aircraft is airborne. In the first implementation, the last transponder cannot be turned off until the aircraft has landed. In the second implementation, turning off one transponder automatically turns on the next transponder in the circular daisy chain such that one transponder will always be turned on.

We claim:

1. A system to prevent an aircraft from becoming invisible to air traffic control, comprising:
   a first transponder and a second transponder electrically connected together and communicating with an airborne circuit on the aircraft to confirm whether the aircraft is airborne or grounded;
   a transponder control circuit that automatically switches on the second transponder if the first transponder is turned off and prevents both transponders from being turned off when the aircraft is airborne such that one of the first or second transponder is always on when the aircraft is airborne to ensure the aircraft does not become invisible to air traffic control; and
   wherein the transponder control circuit allows the transponders to be turned off when the aircraft has landed.

2. The system of claim 1, wherein the airborne circuit includes a squat switch that is compressed when the aircraft is on the ground and uncompressed when the aircraft is airborne, and a touchdown relay that electronically confirms when the aircraft is either airborne or on the ground.

3. The system of claim 1 further comprising a circuit to turn on at least one transponder if the aircraft becomes airborne without a transponder being turned on.

4. The system of claim 1 wherein the first and second transponders may be turned off while the aircraft is on the ground.

5. The system of claim 1 further comprising a third transponder electrically connected to the first and second transponders.

6. The system of claim 1 wherein the first transponder, second transponder and third transponder are connected in a linear sequence with the transponder control circuit, wherein the transponder control circuit automatically turns on the second transponder when the first transponder is turned off when the aircraft is airborne, automatically turns on the third transponder if the second transponder is turned off when the aircraft is airborne, and the third transponder is not allowed to be turned off until the aircraft has landed such that one transponder will always be turned on when the aircraft is airborne.

7. The system of claim 1 wherein the first transponder, second transponder and third transponder are connected in a circular daisy chain with the transponder control circuit which automatically turns on the next transponder in the circular daisy chain when a transponder is turned off such that one transponder will always be turned on when the aircraft is airborne.

8. The system of claim 7 wherein the transponder control circuit comprises:
   a turn-on-next output that indicates the transponder is being turned off;
   a turn-on-next input that receives a second turn-on-next output from an adjacent transponder; and
   wherein the transponder control circuit causes the transponder to turn on when the second turn-on-next output received at the turn-on-next input indicates the adjacent transponder has turned off.

9. The system of claim 8 wherein the turn-on-next output of the transponder control circuit is generated with a /Q output of an SR flip-flop.

10. A system to prevent an aircraft from becoming invisible to air traffic control, comprising:
    a first transponder, a second transponder and a third transponder electrically connected together and communicating to an airborne circuit on the aircraft to confirm whether the aircraft is airborne or grounded;
    a transponder control circuit that automatically switches on the second transponder if the first transponder is turned off when the aircraft is airborne such that one of the first or second transponder is always on when the aircraft is airborne to ensure the aircraft does not become invisible to air traffic control; and wherein the transponder control circuit allows the transponders to be turned off when the aircraft has landed;

wherein the first transponder, second transponder and third transponder are connected in a circular daisy chain with the transponder control circuit which automatically turns on the next transponder in the circular daisy chain when a transponder is turned off such that one transponder will always be turned on when the aircraft is airborne; and wherein the transponder control circuit comprises:

a turn-on-next output that indicates the transponder is being turned off;

a turn-on-next input that receives a second turn-on-next output from an adjacent transponder; and wherein the transponder control circuit causes the transponder to turn on when the second turn-on-next output received at the turn-on-next input indicates the adjacent transponder has turned off.

11. A method to prevent an aircraft from becoming invisible to air traffic control, comprising:

providing at least a first transponder and a second transponder electrically connected together and communicating to an airborne circuit on the aircraft to confirm whether the aircraft is airborne or grounded;

when one transponder is turned off, automatically turning on a next transponder and preventing both transponders from being turned off if the aircraft is airborne such that one of the first or second transponder is always on when the aircraft is airborne to ensure the aircraft does not become invisible to air traffic control.

12. The method of claim 11, further comprising the step of using a squat switch that is compressed when the aircraft is on the ground and uncompressed when the aircraft is airborne, and a touchdown relay are utilized to electronically confirm when the aircraft is either airborne or on the ground.

13. The method of claim 11 further comprising turning on at least one transponder if the aircraft becomes airborne without a transponder being turned on.

14. The method of claim 11 further comprising allowing all the transponders to be turned off when the aircraft has landed.

15. The method of claim 11 further comprising providing a third transponder electrically connected to the first and second transponders.

16. The method of claim 15 further comprising the steps of:

automatically turning on the second transponder when the first transponder is turned off when the aircraft is airborne;

automatically turning on the third transponder if the second transponder is turned off when the aircraft is airborne;

wherein the third transponder is not allowed to be turned off until the aircraft has landed such that one transponder will always be turned on when the aircraft is airborne; and wherein the first transponder, second transponder and third transponder are connected in a linear sequence.

17. The method of claim 15 further comprising the steps of:

connecting the first transponder, second transponder and third transponder in a circular daisy chain; and automatically turning on a next transponder in the circular daisy chain when a transponder is turned off such that one transponder will always be turned on when the aircraft is airborne.

18. The method of claim 17 further comprising the steps of:

providing for each transponder a turn-on-next output and a turn-on-next input, wherein the turn-on-next output indicates the transponder is being turned off and the turn-on-next input is received from a second turn-on-next output from an adjacent transponder; and turning on the transponder when the second turn-on-next output received at the turn-on-next input indicates the adjacent transponder has turned off.

19. The method of claim 18 further comprising the step of generating the turn-on-next output of the transponder with a /Q output of an SR flip-flop.

\* \* \* \* \*

UNITED STATES PATENT AND TRADEMARK OFFICE
CERTIFICATE OF CORRECTION

Page 1 of 1

PATENT NO. : 10,928,506 B1
APPLICATION NO. : 17/007228
DATED : February 23, 2021
INVENTOR(S) : Cooper C Woodring et al.

It is certified that error appears in the above-identified patent and that said Letters Patent is hereby corrected as shown below:

In the Claims

Column 14, Line 25 "The system of claim 1 wherein the first transponder," should be --"The system of claim 5 wherein the first transponder,--;

Column 14, Line 36 "The system of claim 1 wherein the first transponder," should be --"The system of claim 5 wherein the first transponder"--.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*